(12) United States Patent
Lin et al.

(10) Patent No.: US 8,358,300 B2
(45) Date of Patent: Jan. 22, 2013

(54) DISPLAY CARD AND DISPLAY CARD OPERATING METHOD

(75) Inventors: Pei-Jung Lin, Taipei (TW); Jung-Tai Chen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 462 days.

(21) Appl. No.: 12/775,502

(22) Filed: May 7, 2010

(65) Prior Publication Data

US 2010/0283791 A1   Nov. 11, 2010

(30) Foreign Application Priority Data

May 8, 2009   (TW) .............................. 98115262 A

(51) Int. Cl.
   *G06F 3/038*   (2006.01)
(52) U.S. Cl. ....................................... 345/211; 345/501
(58) Field of Classification Search .................. 345/211, 345/501
   See application file for complete search history.

(56) References Cited

U.S. PATENT DOCUMENTS

| | | | |
|---|---|---|---|
| 6,822,841 B2 | 11/2004 | Chang | |
| 7,523,336 B2 * | 4/2009 | Grasso et al. | 713/330 |
| 2003/0227728 A1 * | 12/2003 | Chang et al. | 361/90 |
| 2009/0213533 A1 * | 8/2009 | Bulucea | 361/679.02 |

FOREIGN PATENT DOCUMENTS

| | | |
|---|---|---|
| CN | 1652061 A | 8/2005 |
| CN | 101295205 A | 10/2008 |

* cited by examiner

*Primary Examiner* — Kevin M Nguyen
*Assistant Examiner* — Sepideh Ghafari
(74) *Attorney, Agent, or Firm* — CKC & Partners Co., Ltd.

(57) ABSTRACT

The display card determines whether the first power voltage and the second power voltage supplied by the power supply are within inconsistent input timings, and ensure the third power voltage can be generated accurately to the graphics processing unit to work normally. Therefore, even when the display card cooperates with power supplies having different standards, the graphics processing unit is avoided from malfunctioning or being operated imprecisely by inconsistent timings of input power sources in reaching the display card.

9 Claims, 8 Drawing Sheets

DISPLAY CARD AND DISPLAY CARD OPERATING METHOD

BACKGROUND OF THE INVENTION

1. Field of the Invention

The present invention is related to a display card and an operating method, more particularly, to a display card and an operating method that provides a display card for detecting whether the power voltage is supplied to the graphics processing unit of the display card.

2. Description of the Related Art

A traditional display card is adapted to a particular specification of motherboards and power supplies, for the GPU (Graphics Processing Unit) on the display card can be worked. The power supply supplies the power voltage to the motherboard and the display card as shown in FIG. 1. According to FIG. 1, the display card 100 receives the first power voltage V1 from the power supply 120 and the second power voltage V2 from the motherboard 110, and the display card 100 generates a third power voltage V3 to the graphic processing unit 130 based on the first power voltage V1 and the second power voltage V2. Generally, the first power voltage V1 is 12V and the second power voltage V2 is 3.3V in the display card. The motherboard 110 converts a power voltage V4 from the power supply 120 to the second power voltage V2, and provides the second power voltage V2 to the display card 100 by the PCI-E interface on the motherboard 110. Generally, the power voltage V4 is 12V, 5V or 3.3V.

However, if the first power voltage (V1) and the second power voltage (V2) supply to the display card 100 within inconsistent input timings by the power supply 120, for example, the second power voltage V2 supplies to the display card is later than the first power voltage V1, the display card can not generate the third power voltage V3 to the GPU on time, eventually, the display card will not be operated.

BRIEF SUMMARY OF THE INVENTION

The present invention discloses a display card that can normally work even the power sources supplied within inconsistent input timings. The display card comprising: a power processing module; a graphics processing unit; and a power logic circuit. The power processing module is to receive an enable signal and generates a third power voltage V3 to the graphics processing unit according to the enable signal. The graphics processing unit is operated according to the third power voltage. The power logic circuit is to detect whether the first power voltage and the second power voltage are both received, then, the power logic circuit outputs an enable signal accordingly, A power supply and a motherboard are also provided to supply a first power voltage and a second power voltage, respectively.

The display card operating method is also disclosed in the present invention. The method comprising the steps of: detecting whether a power logic circuit is disposed in the display card; detecting whether the first power voltage and the second power voltage are both received by the power logic circuit when the power logic circuit is detected in the display card; if the power logic circuit does not receive the first power voltage or the second power voltage, the graphics processing unit stops operation; and if the power logic circuit both receives the first power voltage and the second power voltage, the power logic circuit enables the power processing module, and the power processing module generating a third power voltage to a graphics processing unit; wherein the power logic circuit generates an enable signal when the power logic circuit receives the first power voltage and the second power voltage.

DETAILED DESCRIPTION OF THE PREFERRED EMBODIMENT

Conventional display cards are easy to be damaged due to power supplying within different timing, A display card equipped with a power logic circuit is disclosed to reduce the damage ratio. The power logic circuit of the display card of the present invention can determine whether the first power voltage and the second power voltage are both received, and based on the determine result to generate an enable signal, thus to ensure the GPU of the display card work normally.

Figure 1:
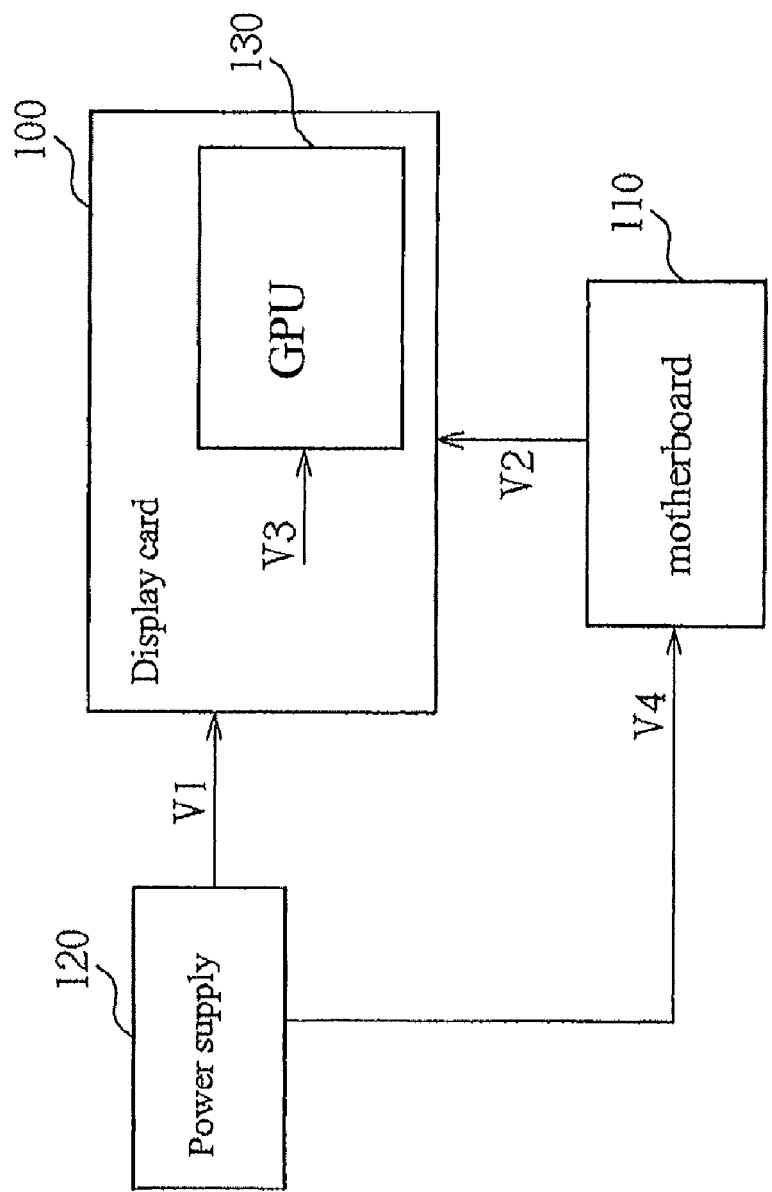
FIG. 1 is a block diagram showing a traditional display card with a graphic processing unit.
Figure 2:
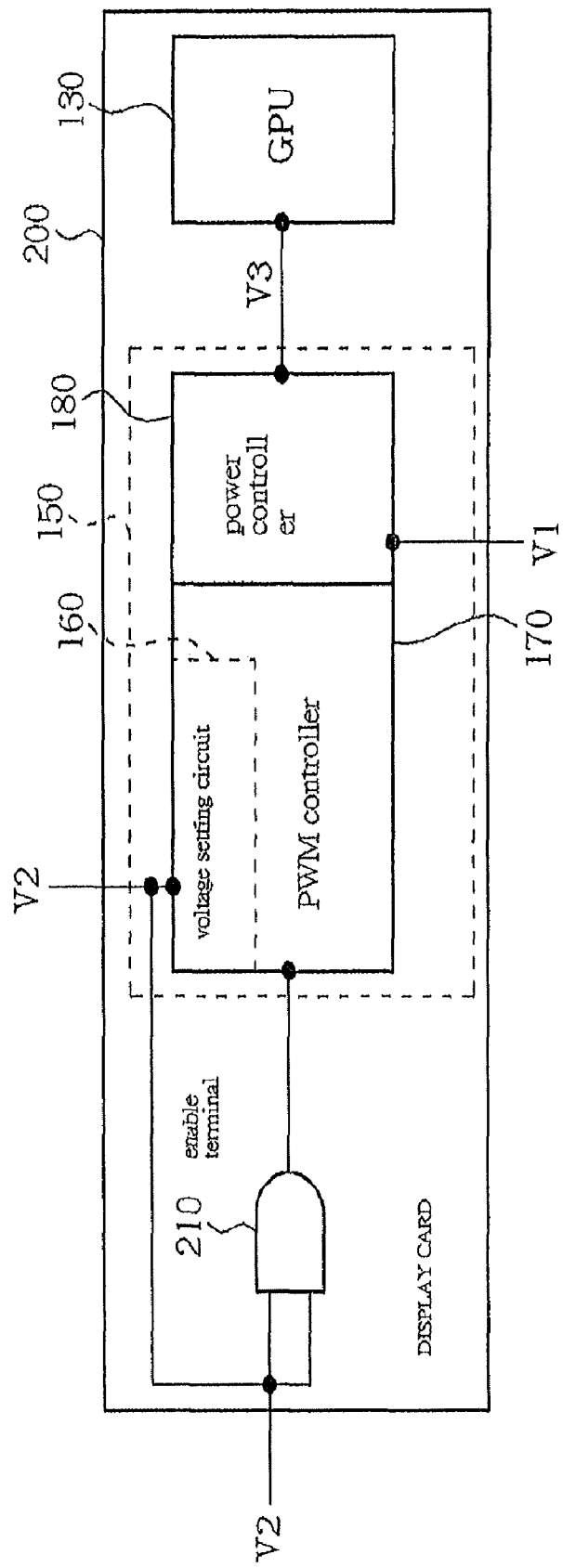
FIG. 2 is a block diagram showing a display card with a power logic circuit for detecting the second power voltage of the present invention.

Please refer to FIG. 2. According to an embodiment of the present invention, an AND gate disposed in the display card 200 is to execute a power logic circuit to detect the second power voltage V2. According to FIG. 2, the display card 200 comprises a power processing module 150, an AND gate 210, and a graphics processing unit 130. The display card 200 (as show as the display card 100 in FIG. 1) can receive the power voltages (V1, V2) from the power supply 120. The power processing module 150 comprises a voltage setting circuit 160, a PWM controller 170, and a power controller 180. The voltage setting circuit 160 receives the second power voltage (V2) and controls the PWM controller 170 according the second power voltage (V2). And the power controller 180 outputs the third power voltage (V3) to the graphics processing unit130.

The power controller 180 outputs the third power voltage (V3) to the graphics processing unit 130 according the PWM controller170 and the first power voltage (V1). The AND gate 210 is used for detecting whether the second power voltage (V2) is received. When the AND gate 210 receives the second power voltage (V2), the AND gate 210 outputs an enable signal to the power processing module 150, and controls the PWM controller 170 according to the second power voltage (V2). The power controller 180 generates the third power voltage (V3) and provides to the graphic processing unit130.

According to the embodiment of the present invention as shown in FIG. 2. Once the power logic circuit 210 receives both the first power voltage (V1) and the second power voltage (V2), the power controller 180 generates the power voltage (V3) and provides to the graphics processing unit. The second power voltage V2 is supplied by the motherboard 110, therefore, the second power voltage V1 will receive by the display card 200 later than the first power voltage V1.

Figure 3:
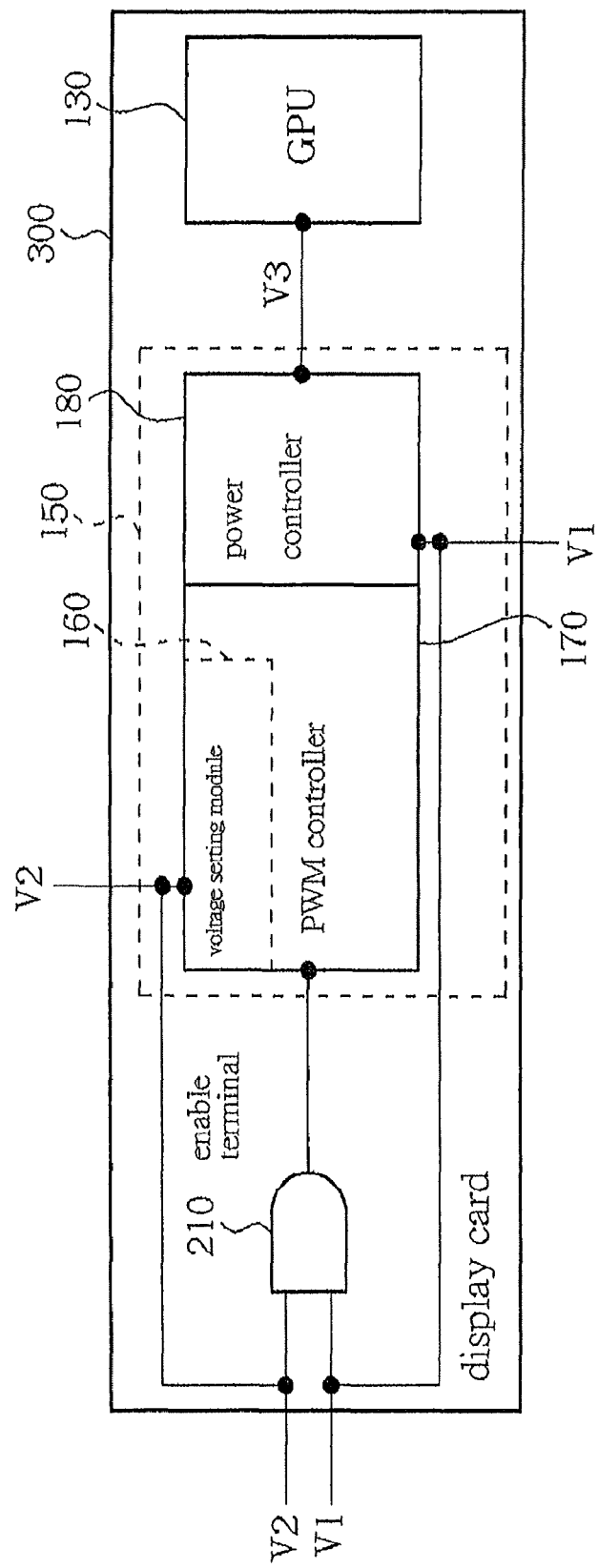
FIG. 3 is a block diagram showing a display card with a power logic circuit for detecting the first power voltage and the second power voltage of the present invention.

The second embodiment of the present invention is shown in FIG. 3. A power logic circuit (AND gate in the present embodiment) is used for detecting whether the first power voltage (V1) and the second power voltage (V2) are received at the same time.

The display card 200 only detects the second power voltage (V2) as showed in FIG. 2. In FIG. 3, the display card 200 can both detect the second power voltage (V2) and the first power voltage (V1). The AND gate 210 outputs an enable signal to the enable signal terminal of the power processing module 150 when the first power voltage (V1) and the second power voltage (V2) are both received. The voltage setting circuit 160 receives the second power voltage (V2) and controls the PWM controller 170 according the second power voltage (V2). And the power controller 180 outputs the third power voltage (V3) to the graphics processing unit130.

Figure 4:
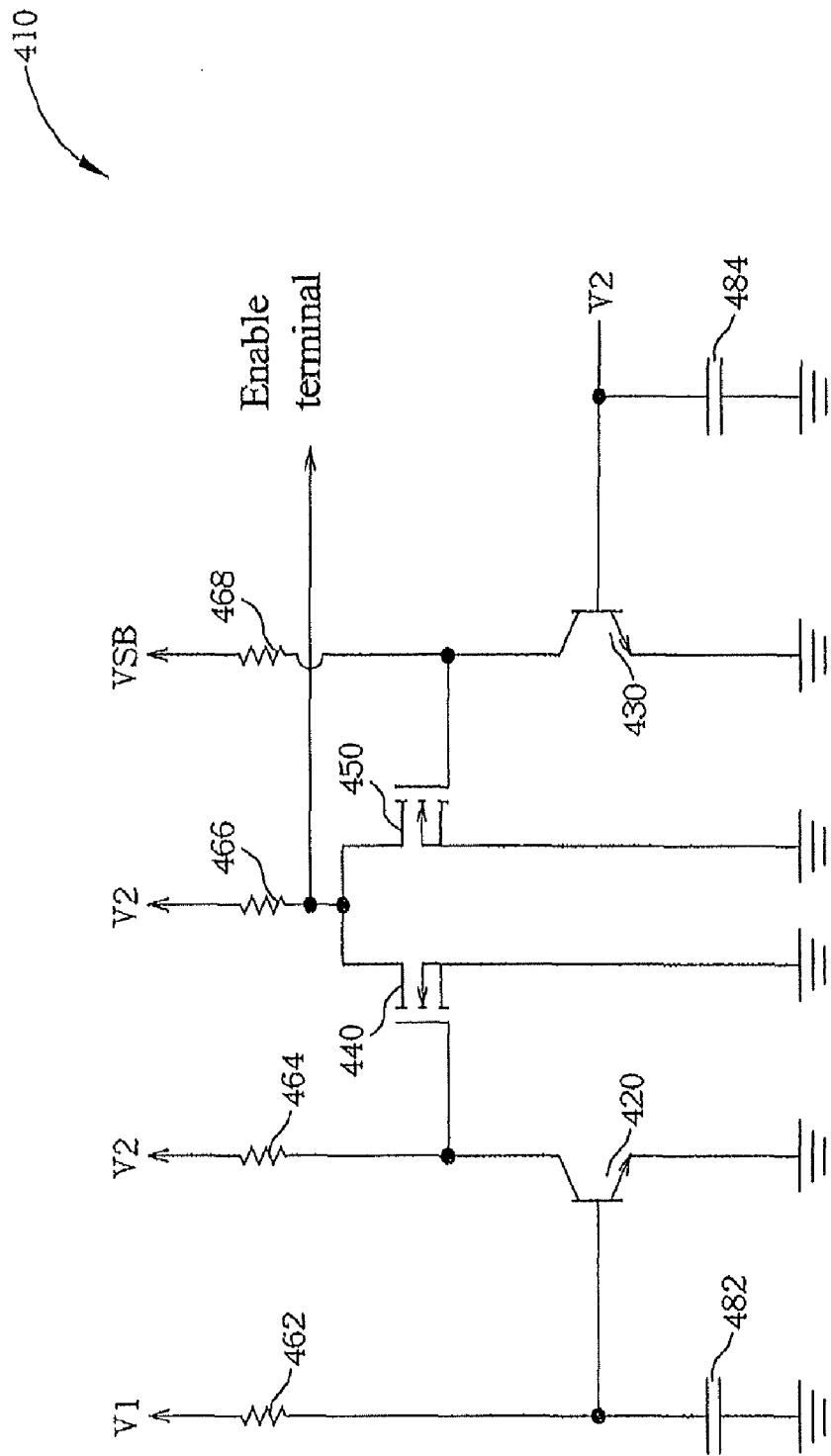
FIG. 4 is showing a detail circuit of the power logic circuit of the first embodiment of the present invention.

According to a third embodiment of the present invention, a detail circuit of the power logic circuit 410 (AND circuit) is showed in FIG. 4. The power logic circuit 410 comprises: a first N-type BJT 430, a first N-type FET 450, a second N-type BJT 420, a second N-type FET 440, resistors 462,464,466, 468, and capacitors 482,484.

The B end of the first N-type BJT430 is connected to the second power voltage (V2). The G end of the first N-type FET450 is connected to the C end of the first N-type BJT 430, and the G end of the first N-type FET 450 is connected to a VSB power voltage (VSB) through a resistor 468. The D end of the first N-type FET 450 is connected to the second power voltage (V2) through a resistor 466. The B end of the second N-type BJT 420 is connected to the first power voltage (V1) through a resistor 462. The C end of the second N-type BJT 420 is connected to the second power voltage (V2) through a resistor 464. The G end of the second N-type FET 440 is connected to the C end of the second N-type BJT 420. The D end of the second N-type FET 440 is connected to D end of the first N-type FET 450. An enable terminal of the power processing module150 is connected to a D end of the first N-type FET 450. When the enable terminal is kept at a high level voltage, the first power voltage (V1) and the second power voltage (V2) are both determined as received by the power logic circuit. Otherwise, the motherboard always supplies the VSB power voltage.

According to an embodiment of the present invention, the first power voltage (V1) is 12V, the second power voltage (V2) is 3.3V, and the VSB power voltage is 3V. The power logic circuit 410 has two different operation modes. In the first mode, the AND gate receives the first power voltage (V1), but not the second power voltage (V2). At this time, the VSB power voltage keeps at a high level voltage and the second power voltage keeps at a low level voltage. Therefore, the first N-type BJT 430 will be turned off, and the first N-type FET 450 will be turned on. The enable signal will be kept at a low level voltage.

Furthermore, the second N-type BJT 420 will be turned on due to the first power voltage (V1) keeps at a high level voltage. The voltage level of the enable terminal will be raised when the second N-type FET 440 is turned off. To keep the enable terminal signal at a high level voltage, it must meet the follow conditions: the first N-type FET 450 and the second N-type FET440 are turned off at the same time, and the resistor 466 is kept at a high level voltage. According to the condition above, the enable terminal signal must be at a low level voltage once the first N-type FET 450 is turned on.

However, When the AND gate receives the second power voltage (V2), the first N-type BJT 430 turns on, the first N-type FET turns off, and the enable terminal will be kept at a high level voltage. Meanwhile, the power processing module 150 will generate a third power voltage V3 to the graphic processing unit 130.

When the AND gate receives the second power voltage (V2) but not the first power voltage (V1), the second N-type BJT 420 will be turned off, the second N-type FET 440 will be turned on, and the enable terminal is kept at a low level voltage. Next, when the AND gate receives the first power voltage (V1), the second N-type BJT 420 will be turned on and the second N-type FET440 will be turned off.

Moreover, if the AND gate did not receive the first power voltage (V1), the first N-type BJT 430 will be turned on, and the first N-type FET 450 will be turned off. When the first N-type BJT 430 and the first N-type FET 450 are turn off, the enable terminal will be kept at a high level voltage. And, the power processing module 150 will generate the third power voltage (V3) to the graphic processing unit 130.

Figure 5:
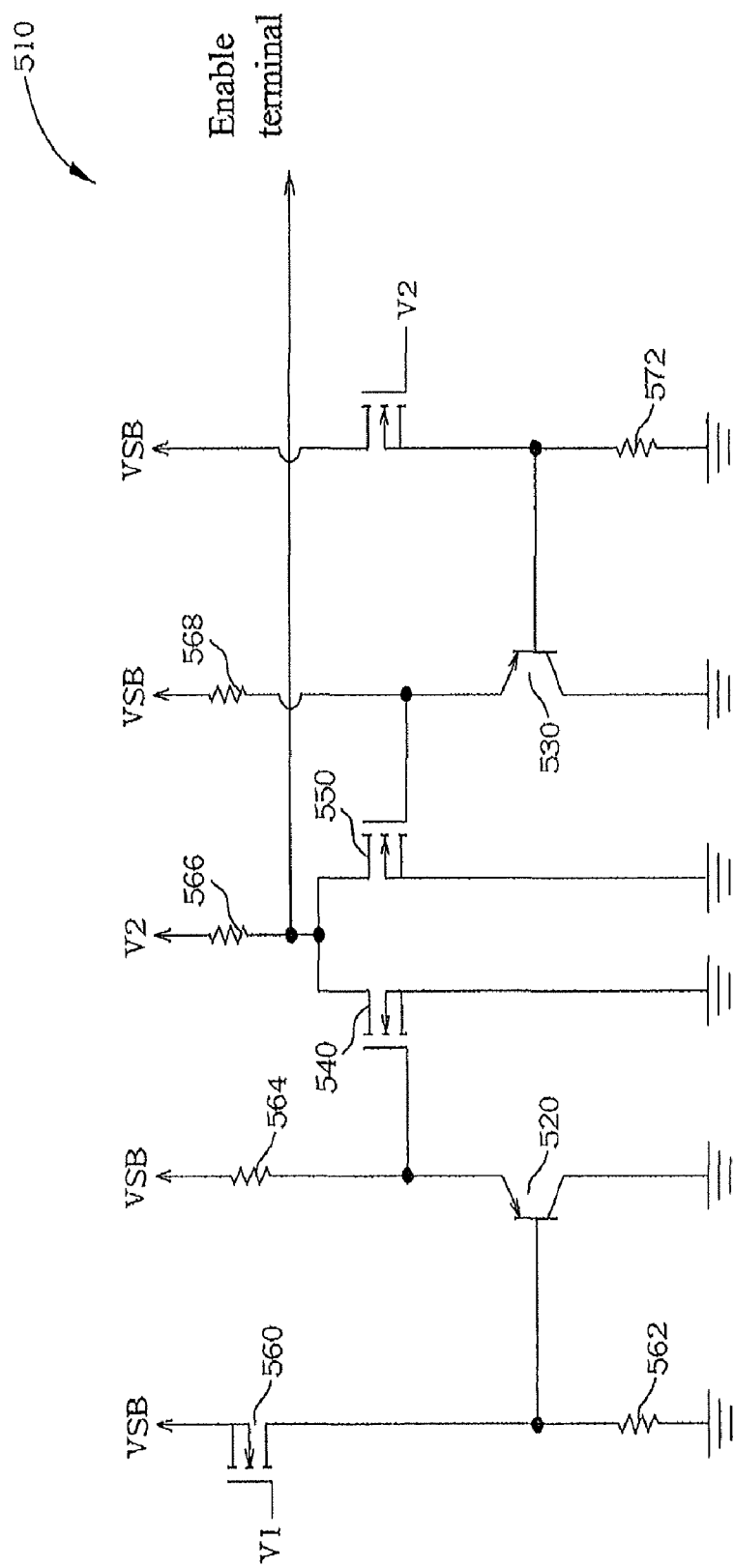
FIG. 5 is showing a detail circuit of the power logic circuit of the second embodiment of the present invention.

FIG. 5 shows a detail circuit of the power logic circuit 510 according to the fourth embodiment of the present invention. The power logic circuit 510 comprises a first P-type BIT 530, a first N-type FET 550, a second P-type BJT 520, a second N-type FET 540, a first P-type FET 570, a second N-type FET 560 and resistors 562, 564,566,568,572.

The E end of the first P-type BJT 530 is connected to the VSB power voltage through a resistor 568. The G end of the first N-type FET 550 is connected to the E end of the first P-type BIT 530. The D end of the first N-type FET 550 is connected to the second power voltage (V2) through a resistor 566. The E end of the second P-type BIT 520 is connected to the VSB power voltage through a resistor 564. The G end of the second N-type FET 540 is connected to the E end of the second P-type BIT 520. The D end of the second N-type FET 540 is connected to D end of the first N-type FET 550. The D end of the first P-type FET 570 is connected to a B end of the first P-type BIT 530. The G end of the first P-type FET 570 is connected to the second power voltage (V2). The S end of the first P-type FET 570 is connected to the VSB power voltage. The D end of the second p-type FET 560 is connected to the B end of the second P-type BIT 520. The 0 end of the second P-type FET 520 is connected to the first power voltage (V1). The S end of the second P-type FET 520 is connected to the VSB power voltage.

An enable terminal of the power processing module 150 is connected to a D end of the first N-type FET 550. When the enable terminal is kept at a high level voltage, the power logic circuit determines the first power voltage (V1) and the second power voltage (V2) are both received. The power logic circuit 410 has two different operation modes.

In the first mode, the AND gate receives the first power voltage (V1), but not the second power voltage (V2). At this time, the VSB power voltage is kept at a high level voltage. Therefore, the first P-type FET 570 will be turned on, the first P-type BJT 530 will be turned off, and the first N-type FET 550 will be turned on. Hence, the voltage of the enable terminal will be kept in low level voltage. When the AND gate receives the second power voltage (V2), the first P-type BJT 570 will be turned off and the first P-type BJT 530 will be turned on, and the first N-type BJT 550 will be turned Off.

When the AND gate receives the first power voltage (V1), the second P-type FET 560 will be turned off, the second P-type BJT 520 will be turned on, and the second N-type BJT 540 will be turned off. The enable terminal will be kept in high level voltage under the condition that the first N-type FET 550 and second N-type FET 540 are both turned off. Thus, the power processing module 150 will generate the third power voltage (V3) to the graphic processing unit130.

When the AND gate receives the second power voltage (V2) but not the first power voltage (V1) The second P-type FET 560 will be turned on and the second P-type BJT 520 will be turned off and the second N-type BJT 540 will be turned on. Hence, the enable terminal will be kept at a low level voltage. Next, when the AND gate receives the first power voltage (V1), the second P-type FET 560 will be turned off, the second P-type BJT 520 will be turned on, and the second N-type FET 540 will be turned off.

Since the first P-type FET 570 is turned off, the first P-type BJT 530 is turned on, and the first N-type FET550 is turned off while the AND gate receives the second power voltage (V2) but not the first power voltage (V1). Both the first N-type FET550 and the second N-type FET540 will be turned off, and keeps the enable terminal at a high level voltage. Thus, the power processing module 150 will generate the third power voltage (V3) to the graphic processing unit 130.

Figure 6:
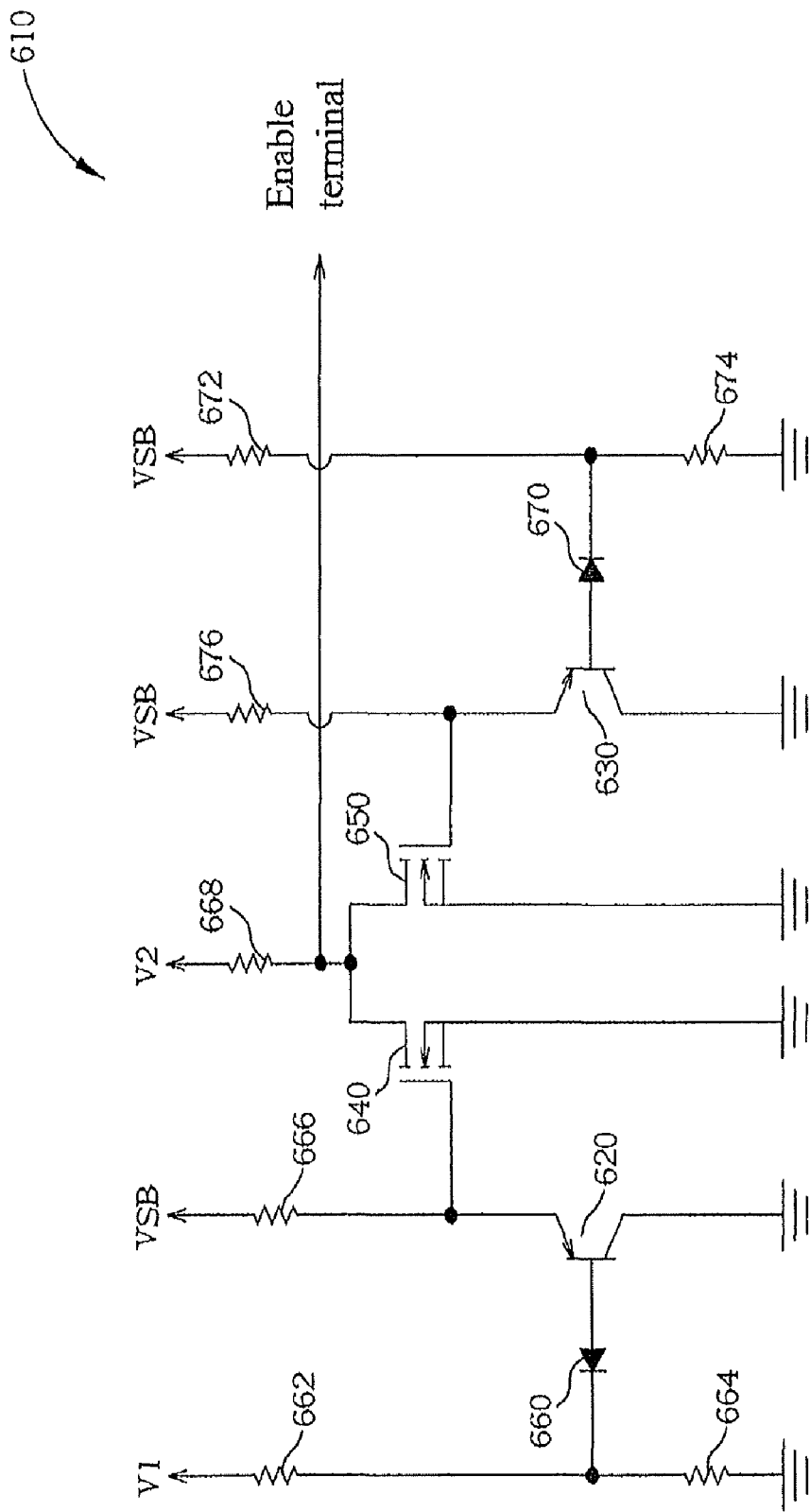
FIG. 6 is showing a detail circuit of the power logic circuit of the third embodiment of the present invention.

FIG. 6 shows a detail circuit of the power logic circuit 610 (detail AND circuit) according to a fifth embodiment of the present invention. The power logic circuit 610 comprises a first p-type BJT 630, a first P-type FET 650, a first diode 670, a second P-type BJT 620, a second P-type FET 640, a second diode 660, resistors 662, 664,666,668,676 672 674 and capacitors 482, 484.

The E end of the first p-type BJT 630 is connected to the VSB power voltage through the resistor 676. The G end of the first p-type FET 650 is connected to the E end of the first p-type BJT 630. The S end of the first P-type FET 650 is connected to the second power voltage V2 through the resistor 668. The P end of the first diode 670 is connected to the C end of the first p-type BJT 630. The N end of the first diode 670 is connected to the second power voltage V2 through the resistor 670. The E end of the second P-type BJT 620 is connected to the VSB power voltage through the resistor 666. The G end of the second P-type FET 640 is connected to the E end of the second P-type BJT 620. The S end of the second P-type FET 640 is connected to the S end of the first P-type FET 650. The P end of the second diode 660 is connected to the B end of the second P-type BJT 620. The N end of the second diode 660 is connected to the first power voltage V1 through the resistor 662. The enable terminal of the power processing module 150 is connected to an S end of the first P-type FET 650. When the enable terminal is kept at a high level voltage, the power logic circuit determines that the first power voltage V1 and the second power voltage V2 are both received.

The operation of the power logic circuit 610 is also described in two different modes. When the AND gate receives the first power voltage V1 but not the second power voltage V2, the first diode 670 will be turned on, the first P-type BJT 630 will be turned on, first P-type FET 650 is turned on Therefore; the enable terminal will be kept at a low level voltage.

When the AND gate receives the second power voltage V2, the first diode 670, the first P-type BJT 630 and the first P-type FET 650 will all be turned off. The second diode 660 will be turned off because the AND gate receives the first power voltage V1 but not the second power voltage V2. And the second P-type BJT 620 and the second P-type FET 640 will both be turned off. Under this condition, the first P-type FET 650 and the second P-type FET 640 will be turned off at the same time, and the enable terminal will keep at a high level voltage. And, the power processing module 150 will generate the third power voltage V3 to the graphic processing unit 130.

When the AND gate receives the second power voltage V2 but not the first power voltage V1, the second diode 660, the second P-type BJT 620, and the second P-type FET 640 will all be turned on. And the enable terminal will keep at a low level voltage.

Following when the AND gate receives the first power voltage V1, the second diode 660, the second P-type BJT 620, and the second P-type FET 640 will all be turned of When the AND gate receives the second power voltage V2 but not the first power voltage V1, the first diode 670, the first P-type BJT 630, and the P-type FET 650 will all be turned off.

Since the first P-type BJT 650 and the second P-type 640 FET are turned off at the same time, and the AND gate received the second power voltage V2 already, therefore, the enable terminal will be kept at a high level voltage. Hence, the power processing module 150 will generate the third power voltage V3 to the graphic processing unit 130.

Figure 7:
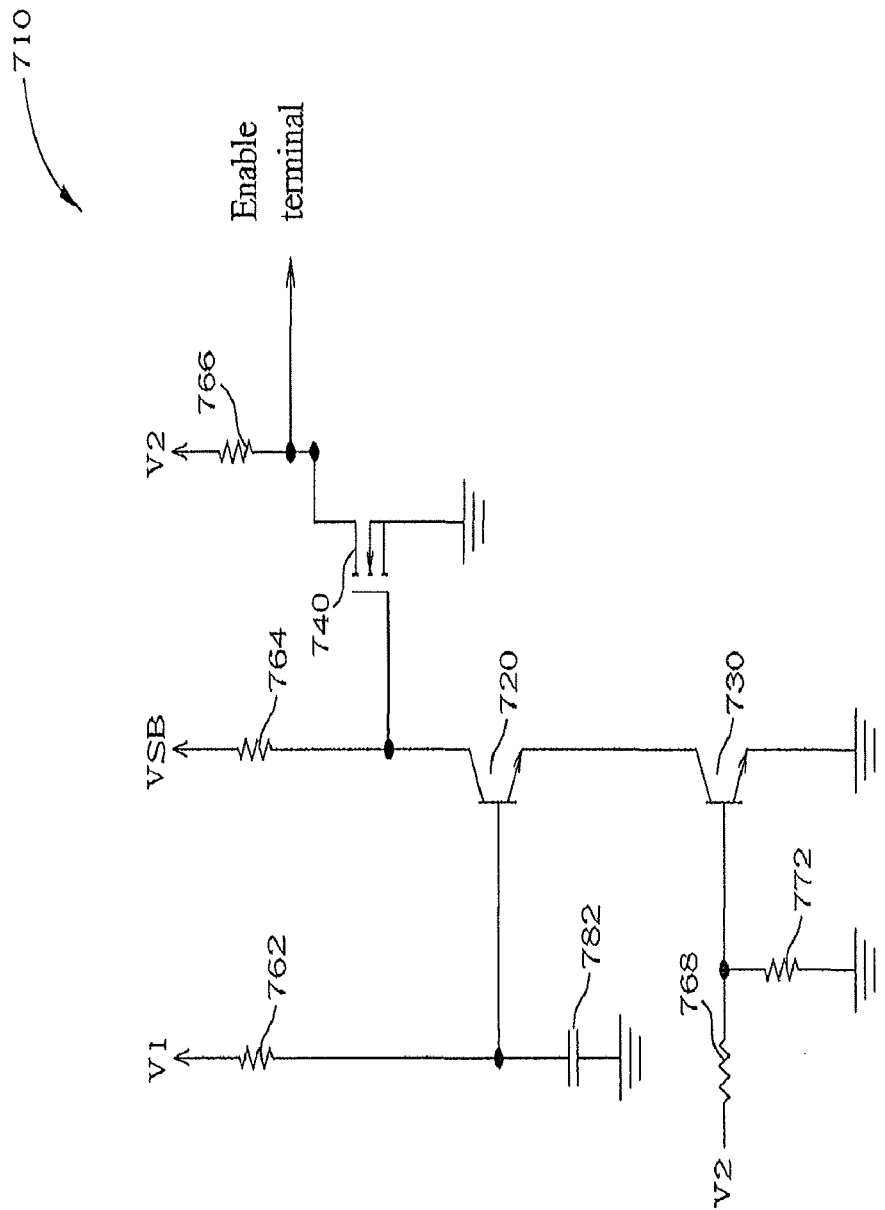
FIG. 7 is showing a detail circuit of the power logic circuit of the fourth embodiment of the present invention.

FIG. 7 shows a detail circuit of the power logic circuit 710 (detail AND circuit) according to a sixth embodiment of the present invention. The power logic circuit 710 comprises: a first N-type BJT 720, a second N-type BJT 730, a first N-type FET 740, resistors 762, 764, 766, 768, 772, and a capacitor 782.

The C end of the first N-type BJT 720 is connected to the VSB power voltage through a resistor 764. The B end of the first N-type BJT 720 is connected to the first power voltage V1 through a resistor 762. The B end of the second N-type BJT 730 is connected to the second power voltage V2 through a resistor 768. The C end of the first N-type BJT 720 is connected to the E end of the first N-type BJT 720. The D end of the first N-type FET 740 is connected to the second power voltage V2 through a resistor 766. The G end of the first N-type FET 740 is connected to the C end of the first N-type BJT 720. A enable terminal of the power processing module150 is connected to a D end of the first N-type FET 450. When the enable terminal is kept at a high level voltage, the power logic circuit 710 determines the first power voltage V1 and the second power voltage V2 are both received.

When the AND gate receives the first power voltage V1 but not the second power voltage V2. The second N-type BJT730 will be turned off. The first N-type BJT 720 is turned on since the AND gate receives the first power voltage V1. However, the enable terminal will be kept at a low level voltage because the second N-type BJT 730 is turned off but the N-type FET 740 is turned on. When the AND gate receives the second power voltage V2, the first N-type BJT 730 and the second N-type BJT 720 is turned on, but the N-type FET 740 will be turned off. As a result, the enable terminal will be kept at a high level voltage, and the power processing module 150 will generate the third power voltage V3 to the graphic processing unit 130.

When the AND gate receives the second power voltage V2 but not the first power voltage V1. The second N-type BJT730 will be turned on, and then the first N-type BJT 720 will be turned off. When the AND gate receives the first power voltage V), the first N-type BJT 720 and the second N-type BJT 730 will both be turned on but the N-type FET 740 will be turned off. The enable terminal will be kept at a high level voltage, and the power processing module 150 will generate the third power voltage V3 to the graphic processing unit 130.

Figure 8:
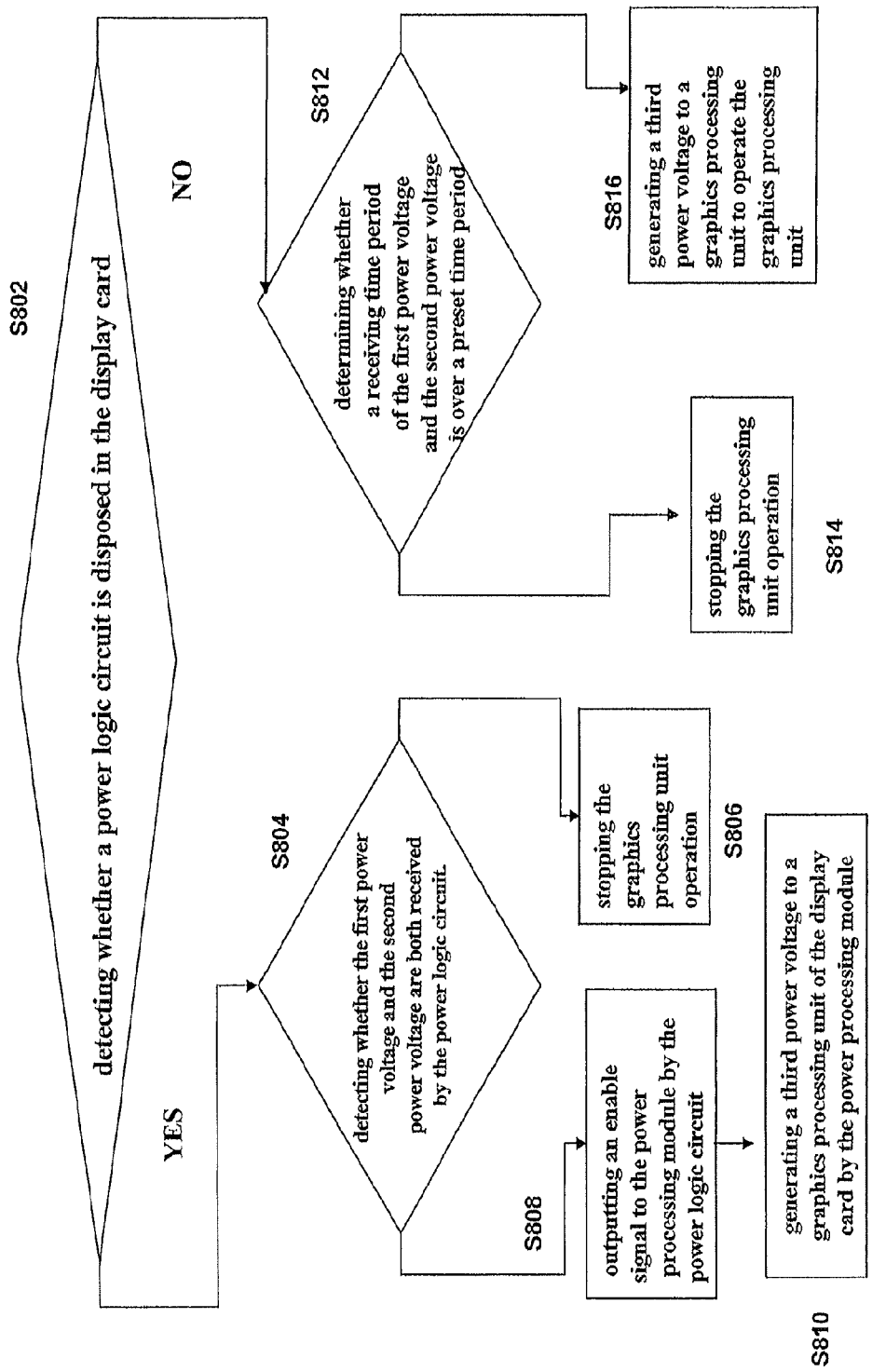
FIG. 8 is showing a flowchart showing a display card operating method of the present invention.

The display card operating method according to the embodiments above is showed in FIG. 8. The method comprises the steps as following;

STEP802: detecting whether a power logic circuit is disposed in the display card. If the power logic circuit is disposed in the display card, go to the STEP 804; otherwise, go to the STEP 812, STEP 804: detecting whether the first power voltage and the second power voltage are both received by the power logic circuit. If the power logic circuit receives neither the first power voltage nor the second power voltage, go to the STEP 806. If the power logic circuit both receives the first power voltage and the second power voltage, go to STEP 808, STEP 806: stopping the graphics processing unit operation by the power logic circuit, and executes the STEP 804 to wait for both the first power voltage and the second power voltage are received.

STEP 808: outputting an enable signal to the power processing module by the power logic circuit.

STEP 810: generating a third power voltage to a graphics processing unit of the display card by the power processing module, to operate the graphics processing unit, STEP 812: determining whether a receiving time period of the first power voltage and the second power voltage is over a preset time period if the receiving time is inconsistent. If YES, go to the STEP 814; If NO, go to the STEP 816.

STEP 814: stopping the graphics processing unit operation.

STEP 816: generating a third power voltage to a graphics processing unit to operate the graphics processing unit.

Detail features in STEPs 802-810 can be seen in FIGS. 2-7, STEPs 812-816 will be executed while the power logic circuit is not detected in the display card, thus to ensure the display card work normally. Various modifications as showed in FIG. 8 may occur to those skilled in the art and should be included in the scope of the present invention.

The present invention provides a display card that can normally work under inconsistent power input timings. The display card determines whether the first power voltage and the second power voltage supplied by the power supply are within inconsistent input timings, and ensure the third power voltage can be generated accurately to the graphics processing unit to work normally. Compares to the conventional use, the display card disclosed in the present invention can avoid the damage of graphics processing unit due to inconsistent power input timings. Meanwhile, the display card of the present invention can be adapted to various conditions that might input the power within inconsistent timings, such as different power supplies, and the graphics processing unit still remains normal work.

While the present inventive structure, method, has been described with reference to a few specific embodiments, the description is illustrative of the invention and is not to be construed as limiting the invention. Various modifications may occur to those skilled in the art without departing from the scope of the invention as defined by the appended claims. All references cited herein are hereby incorporated by reference.

What is claimed is:

1. A display card comprising:
   a power processing module, for receiving an enable signal and generating a third power voltage according to the enable signal;
   a graphics processing unit, operating according to the third power voltage; and
   a power logic circuit, for detecting whether the first power voltage and the second power voltage are both received, and then generating an enable signal;
   wherein the first power voltage is provided by a power supply and the second power voltage is provided by a motherboard.

2. A display card as claimed in claim 1, wherein the power logic circuit is an AND gate, the AND gate having a first input terminal and a second input terminal both connected to the second power voltage; when the power logic circuit receives the second power voltage, the AND gate outputs an enable signal and transmits to the power processing module, and the power processing module generates the third power voltage to the graphics processing unit.

3. A display card as claimed in claim 1, wherein the power logic circuit comprises:
   a first N-type BJT, the B end of the first N-type BJT is connected to the second power voltage;
   a first N-type FET, the G end of the first N-type FET is connected to the C end of the first N-type BJT and VSB power voltage, and the D end of the first N-type FET is connected to a second voltage power;
   a second N-type BJT, the B end of the second N-type BJT is connected to the first power voltage, and the C end of the second N-type BJT is connected to the second power voltage;
   a second N-type FET, the G end of the second N-type FET is connected to the C end of the second N-type BJT, the D end of the second N-type FET is connected to D end of the first N-type FET; and
   wherein the D end of the first N-type FET is connected to an enable terminal, and when the enable terminal is kept at a high level voltage, the first power voltage and the second power voltage are determined as received by the power logic circuit.

4. A display card as claimed in claim 1, wherein the power logic circuit comprises:
   a first P-type BJT, the E end of the first P-type BJT connecting to the VSB power voltage;
   a first N-type FET, the G end of the first N-type FET connecting to the E end of the first P-type BJT, and the D end of the first N-type FET connecting to the second power voltage;
   a second P-type BJT, the E end of the second P-type BJT connecting to the VSB power voltage;
   a second N-type FET, the G end of the second N-type FET connecting to the E end of the second P-type BJT, and the D end of the second N-type FET connecting to the D end of the first N-type FET;
   a first P-type FET, the D end of the first P-type FET connecting to a B end of the first P-type BJT, the G end of the first P-type FET connecting to the second power voltage, and the S end of the first P-type FET connecting to the VSB power voltage; and
   a second p-type FET, the D end of the second p-type FET connecting to the B end of the second P-type BJT, the G end of the second P-type FET connecting to the first power voltage, and the S end of the second P-type FET connecting to the VSB power voltage;
   wherein the D end of the first N-type FET connecting to an enable terminal, and when the enable terminal is kept at a high level voltage, the first power voltage and the second power voltage are determined as received by the power logic circuit.

5. A display card as claimed in claim 1, wherein the power logic circuit comprises:
   a first p-type BJT, the E end of the first p-type BJT connecting to the VSB power voltage;
   a first P-type FET, the G end of the first p-type FET connecting to the E end of the first p-type BJT, and the S end of the first p-type FET connecting to the second power voltage;

a first diode, the P end of the first diode connecting to the C end of the first p-type BJT, and the N end of the first diode connecting to the second power voltage;

a second P-type BJT, the E end of the second P-type BJT connecting to the VSB power voltage;

a second P-type FET, the G end of the second P-type FET connecting to the E end of the second P-type BJT, the S end of the second P-type FET is connected to the S end of the first P-type FET;

a second diode, the P end of the second diode connecting to the B end of the second P-type BJT, and the N end of the second diode connecting to the first power voltage;

wherein the S end of the first P-type FET is connected to an enable terminal, and when the enable terminal is kept at a high level voltage, the first power voltage and the second power voltage are determined as received by the power logic circuit.

6. A display card as claimed in claim 1, wherein the power logic circuit is a AND gate, and a first input end and a second input end of the AND gate is separately connected to the first power voltage and the second power voltage, when the first power voltage and the second power voltage are determined as received by the power logic circuit, an enable signal is outputted to the power processing module, and a third power voltage is generated by the power processing module and provided to a graphics processing unit.

7. A display card as claimed claim 1, wherein the power logic circuit comprises:

a first N-type BJT, the C end of the first N-type BJT connecting to the VSB power voltage, and the B end of the first N-type BJT connecting to the first power voltage;

a second N-type BJT, the B end of the second N-type BJT connecting to the second power voltage, and the C end of the first N-type BJT connecting to the E end of the first N-type BJT; and a first N-type FET, the D end of the first N-type FET connecting to the second power voltage, the G end of the first N-type FET connecting to the C end of the first N-type BJT;

wherein the D end of the N-type FET is connected to an enable terminal, and when the enable terminal is kept at a high level voltage, the first power voltage and the second power voltage are determined as received by the power logic circuit.

8. An operating method for a display card, comprising:

detecting whether a power logic circuit is disposed in the display card;

detecting whether the first power voltage and the second power voltage are both received by the power logic circuit when the power logic circuit is detected in the display card;

if the power logic circuit receives neither the first power voltage nor the second power voltage, the graphics processing unit stops operation; and if the power logic circuit both receives the first power voltage and the second power voltage, the power logic circuit enables the power processing module, and the power processing module generating a third power voltage to a graphics processing unit; and wherein the power logic circuit generates an enable signal when the power logic circuit receives the first power voltage and the second power voltage.

9. The operating method for a display card as claimed in claim 8, further comprises:

when the power logic circuit is not detected in the display card, determining whether a receiving time period of the first power voltage and the second power voltage is over a preset time period if the receiving time is inconsistent.

\* \* \* \* \*